(12) United States Patent
Signell et al.

(10) Patent No.: US 12,309,482 B2
(45) Date of Patent: *May 20, 2025

(54) METHOD AND SYSTEM FOR COLLECTING EVIDENCE FOLLOWING A VEHICLE INCIDENT

(71) Applicant: Volvo Car Corporation, Gothenburg (SE)

(72) Inventors: Klas Roland Persson Signell, Gothenburg (SE); Egoi Sanchez Basualdo, Gothenburg (SE); Konstantinos Chatziioannou, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 140 days.

This patent is subject to a terminal disclaimer.

(21) Appl. No.: 17/973,578

(22) Filed: Oct. 26, 2022

(65) Prior Publication Data

US 2024/0144815 A1 May 2, 2024

(51) Int. Cl.
*H04N 23/61* (2023.01)
*H04N 5/77* (2006.01)
*H04N 7/18* (2006.01)

(52) U.S. Cl.
CPC ............... *H04N 23/61* (2023.01); *H04N 5/77* (2013.01); *H04N 7/183* (2013.01)

(58) Field of Classification Search
CPC ........... H04N 23/61; H04N 5/77; H04N 7/183
See application file for complete search history.

(56) References Cited

U.S. PATENT DOCUMENTS

| | | | |
|---|---|---|---|
| 2017/0053169 A1* | 2/2017 | Cuban | H04N 7/181 |
| 2020/0349779 A1* | 11/2020 | Schumacher | G07C 5/085 |
| 2021/0312564 A1* | 10/2021 | Katata | G06Q 40/08 |
| 2022/0284514 A1* | 9/2022 | Brandmaier | G08G 1/0112 |
| 2023/0196924 A1* | 6/2023 | Khedekar | G08G 5/0056 |
| | | | 701/3 |
| 2024/0001912 A1* | 1/2024 | Cardona | G06F 16/29 |

* cited by examiner

*Primary Examiner* — Eileen M Adams
(74) *Attorney, Agent, or Firm* — Clements Bernard Walker; Christopher L. Bernard

(57) ABSTRACT

A method and system for collecting evidence following a vehicle incident. The system is operable for detecting and determining a direction associated with the vehicle incident and automatically and contemporaneously requesting and receiving related information from the vehicle itself, potentially from any other vehicle involved, and/or from any surrounding devices, including vehicles, mobile devices, and/or infrastructure devices, that may have captured the vehicle incident.

16 Claims, 8 Drawing Sheets

METHOD AND SYSTEM FOR COLLECTING EVIDENCE FOLLOWING A VEHICLE INCIDENT

TECHNICAL FIELD

The present disclosure relates generally to the automotive field. More particularly, the present disclosure relates to a method and system for collecting evidence following a vehicle incident.

BACKGROUND

Following a vehicle incident, especially one involving another vehicle, it may be difficult to establish what actually happened and there may be disagreement over who was at fault. The driver/occupant of the vehicle may not have actually been present in the vehicle at the time of the vehicle incident or may be in a state of confusion. The other vehicle may even leave the scene, making it difficult to identify the other vehicle or the other driver/occupant. Thus, a party investigating the vehicle incident may have to collect information from unreliable witnesses well after the fact, if there are any that can be identified. The result may be an inadequate determination of circumstances and fault. In such cases, contemporaneous evidence gathering by the vehicle itself would be helpful.

A variety of dash-cams and the like are available that may automatically capture an image/video of a vehicle incident, but all desired angles are not typically covered, and the vehicle incident itself may render such dash-cams and the like inoperable. Thus, these dash-cams and the like may not adequately assist in identifying the other vehicle (by make/model and/or license plate number, for example) and/or the other driver/occupant. In such cases, alternative contemporaneous evidence gathering by the vehicle itself would be helpful.

This background is provided as illustrative environmental context only and is not intended to be limiting in any manner. It will be readily apparent to those of ordinary skill in the art that the concepts and principles of the present disclosure may be implemented in other environmental contexts equally.

SUMMARY

The present disclosure provides a method and system for collecting evidence following a vehicle incident. The system is operable for detecting and determining a direction associated with the vehicle incident and automatically and contemporaneously requesting and receiving related information from the vehicle itself, potentially from any other vehicle involved, and/or from any surrounding devices, including vehicles, mobile devices, and/or infrastructure devices, that may have captured the vehicle incident.

Upon detecting the vehicle incident, the vehicle initiates exterior image capture using all cameras of the vehicle and, if equipped with a deployable drone, deploys the drone to capture birds-eye-view (BEV) images/video of the surroundings and aftermath of the vehicle incident. Further, the vehicle may capture interior images/video of the driver/occupants to determine whether or not the driver/occupants are injured, monitor vital signs of the driver/occupants, and automatically contact first responders. The vehicle opens a communication link with the other vehicle(s) involved (if the other vehicle(s) have granted prior approval), and/or from the surrounding devices, including the vehicles, the mobile devices, and/or the infrastructure devices. Images/videos are requested with a specific timeframe (e.g., 30 seconds before and 1 minute after the vehicle incident). Various other information may also be exchanged over the bidirectional communication link (e.g., system identifiers, witness names and contact information, etc.).

In one illustrative embodiment, the present disclosure provides a method for collecting evidence following a vehicle incident involving a vehicle, the method including: detecting the vehicle incident; determining a direction associated with the vehicle incident; capturing an image/video using a camera of the vehicle responsive to detecting the vehicle incident; and obtaining an image/video from a camera of one or more of another vehicle, a mobile device, and an infrastructure device disposed in proximity to the vehicle responsive to detecting the vehicle incident. Determining the direction associated with the vehicle incident includes determining which side of the vehicle was impacted during the vehicle incident. Capturing the image/video using the camera of the vehicle includes capturing an exterior image/video using an exterior camera of the vehicle. Capturing the exterior image/video using the exterior camera of the vehicle includes capturing an image/video in the direction associated with the vehicle incident. Capturing the image/video using the camera of the vehicle may also include capturing an interior image/video using an interior camera of the vehicle. The interior image/video captures a driver/occupant of the vehicle. The other vehicle may include a vehicle also involved in the vehicle incident, or an uninvolved vehicle. The method may also include obtaining identification information from the one or more of the other vehicle, the mobile device, and the infrastructure device responsive to detecting the vehicle incident. The method may further include monitoring vital signs or assessing and monitoring a health state/condition of a driver/occupant of the vehicle responsive to detecting the vehicle incident. The method may still further include notifying a first responder of the vehicle incident responsive to detecting the vehicle incident. The method may still further include deploying a drone from the vehicle and capturing an image/video using the drone responsive to detecting the vehicle incident. Obtaining the image/video from the camera of the one or more of the other vehicle, the mobile device, and the infrastructure device includes obtaining the image/video for a predetermined period before and after the vehicle incident specified by the vehicle.

In another illustrative embodiment, the present disclosure provides a system for collecting evidence following a vehicle incident involving a vehicle, the system including: a sensor device coupled to the vehicle; a camera coupled to the vehicle; and a memory storing instructions executed by a processor for: detecting the vehicle incident using the senor device of the vehicle; determining a direction associated with the vehicle incident using the sensor device of the vehicle; capturing an image/video using the camera of the vehicle responsive to detecting the vehicle incident; and obtaining an image/video from a camera of one or more of another vehicle, a mobile device, and an infrastructure device disposed in proximity to the vehicle responsive to detecting the vehicle incident. Determining the direction associated with the vehicle incident includes determining which side of the vehicle was impacted during the vehicle incident. Capturing the image/video using the camera of the vehicle includes capturing an exterior image/video using an exterior camera of the vehicle. Capturing the exterior image/video using the exterior camera of the vehicle includes capturing an image/video in the direction associated with the vehicle incident. Capturing the image/video using the camera of the vehicle may also include capturing an interior image/video using an interior camera of the vehicle. The memory may also store instructions executed by the processor for monitoring vital signs or assessing and monitoring a health state/condition of a driver/occupant of the vehicle responsive to detecting the vehicle incident using one or more of an interior camera coupled to the vehicle and a health sensor device disposed within the vehicle. The system may also include a drone deployably coupled to the vehicle, the memory further storing instructions executed by the processor for deploying the drone from the vehicle and capturing an image/video using the drone responsive to detecting the vehicle incident.

In a further illustrative embodiment, the present disclosure provides a non-transitory computer readable medium including instructions stored in a memory and executed by a processor to carry out steps for collecting evidence following a vehicle incident involving a vehicle, the steps including: detecting the vehicle incident; determining a direction associated with the vehicle incident; capturing an image/video using a camera of the vehicle responsive to detecting the vehicle incident; and obtaining an image/video from a camera of one or more of another vehicle, a mobile device, and an infrastructure device disposed in proximity to the vehicle responsive to detecting the vehicle incident.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION

Again, the present disclosure provides a method and system for collecting evidence following a vehicle incident. The system is operable for detecting and determining a direction associated with the vehicle incident and automatically and contemporaneously requesting and receiving related information from the vehicle itself, potentially from any other vehicle involved, and/or from any surrounding devices, including vehicles, mobile devices, and/or infrastructure devices, that may have captured the vehicle incident.

Upon detecting the vehicle incident, the vehicle initiates exterior image capture using all cameras of the vehicle and, if equipped with a deployable drone, deploys the drone to capture BEV images/video of the surroundings and aftermath of the vehicle incident. Further, the vehicle may capture interior images/video of the driver/occupants to determine whether or not the driver/occupants are injured, monitor vital signs of the driver/occupants, and automatically contact first responders. The vehicle opens a communication link with the other vehicle(s) involved (if the other vehicle(s) have granted prior approval), and/or from the surrounding devices, including the vehicles, the mobile devices, and/or the infrastructure devices. Images/videos are requested with a specific timeframe (e.g., 30 seconds before and 1 minute after the vehicle incident). Various other information may also be exchanged over the bidirectional communication link (e.g., system identifiers, witness names and contact information, etc.).

Figure 1:
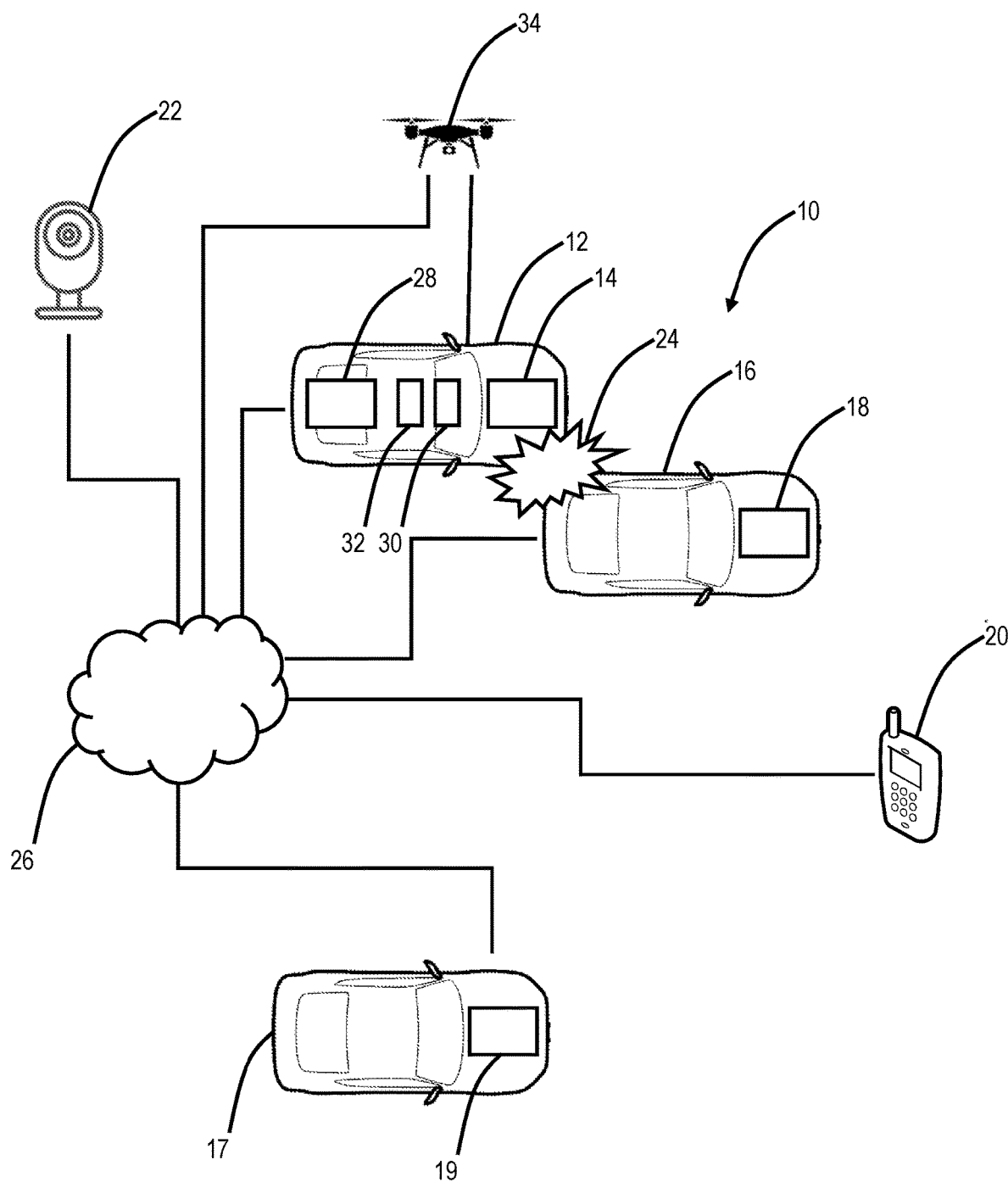
FIG. 1 is a schematic diagram illustrating one embodiment of the evidence collection system of the present disclosure.

FIG. 1 is a schematic diagram illustrating one embodiment of the evidence collection system of the present disclosure. As illustrated, the system 10 includes a vehicle 12 including a camera 14 and other data collection sensors and devices, other vehicles 16,17 including a camera 18,19 and other data collection sensors and devices, a mobile device 20 including a camera and other data collection sensors and devices, and an infrastructure device 22 including a camera and other data collection sensors and devices. The mobile device 20 may be possessed by a person in proximity to the vehicle incident 24 involving the vehicle 12 and another vehicle 16, for example, and the infrastructure device 22 may be a traffic camera or business camera in the area or the like. The other vehicles 16,17, the mobile device 20, and the infrastructure device 22 are able to communicate with the vehicle 12 either directly via wireless or near-field communication links when requested by the vehicle 12, or through a cloud network 26 to which all the components are coupled via wireless, near-field, or wired communication links. As used herein, "camera" and "sensor" refer to any standard, fisheye, or BEV perception sensor, such as a camera, ultrasound, radar, or lidar device, whether front facing, rear facing, side facing, or a combination thereof "Sensor" also refers to any conventional impact, force, acceleration, and like sensor. The vehicle 12 also includes a directional impact sensor system 28 operable for detecting the vehicle incident 24 and determining a direction associated with the vehicle incident 24. For example, the directional impact sensor system 28 is operable for determining if the vehicle incident 24 involved the front, rear, side, or a combination thereof of the vehicle 12.

It should be noted that all components may exchange data after such data is requested and the request is acknowledged and accepted. This acceptance may be given in advance or contemporaneous. For example, all components may already be subscribed to a data-sharing application that provides advance acceptance. All data exchange is performed after proper authentication and verification such that data is not exchanged with an unintended party. Such acceptance, authentication, and verification methodologies are well known to those of ordinary skill in the art and are not described in detail herein.

The vehicle 12 further includes a processing module 30 including a processor and memory storing instructions for capturing an image/video using the camera 14 of the vehicle 12 responsive to the directional impact sensor system 28 detecting and determining the direction associated with the vehicle incident 24 and requesting and obtaining an image/video from another vehicle 16,17, whether it is the other vehicle 16 involved in the vehicle incident 24 or a nearby vehicle 17, the mobile device 20, and/or the infrastructure device 22 disposed in proximity to the vehicle 12 responsive to the directional impact sensor system 28 detecting and determining the direction associated with the vehicle incident 24. Again, determining the direction associated with the vehicle incident 24 includes determining which side or portion of the vehicle 12 was impacted during the vehicle incident 24, such that the most relevant data can be gathered by the vehicle 12, both by itself and from the surrounding parties.

Capturing the image/video using the camera 14 of the vehicle 12 includes capturing an exterior image/video using an exterior camera of the vehicle 12, and preferably in the direction associated with the vehicle incident 24. Capturing the image/video using the camera 14 of the vehicle 12 may also include capturing an interior image/video using an interior camera of the vehicle 12. Related to this interior observation, the system 10 may also be operable for monitoring vital signs or assessing and monitoring a health state/condition of a driver/occupant of the vehicle 12 responsive to detecting the vehicle incident 24 using one or more of the interior camera coupled to the vehicle 12 and a health sensor device 32 disposed within the vehicle 12. For example, health monitoring may be provided using a camera image and an artificial intelligence (AI) algorithm, one or more health monitoring sensors disposed in the vehicle 12 and coupled to the driver/occupant, etc. The system 10 may be operable for automatically contacting emergency services should the condition of the driver/occupant be or become critical when observed.

The system 10 may further include a drone 34 including a camera deployably coupled to the vehicle 12, the system 10 deploying the drone 12 from the vehicle 12 and capturing an image/video using the drone 34 responsive to the directional impact sensor system 28 detecting and determining the direction associated with the vehicle incident 24.

Obtaining the image/video from the camera(s) 17,19 of the other vehicle(s) 16,18, the mobile device 20, and/or the infrastructure device 22 may be constrained to a predetermined period before and after the vehicle incident 24 as specified by the vehicle 12. For example, the vehicle 12 may indicate that it needs data from 30 seconds before the vehicle incident 24 to 1 minute after the vehicle incident 24 to establish what happened, who was at fault and/or the identity of the other vehicle 16 involved. Data may of course include proper timestamp, location, and identification information such that its relevance can be assessed, witnesses can be identified, etc.

Figure 2:
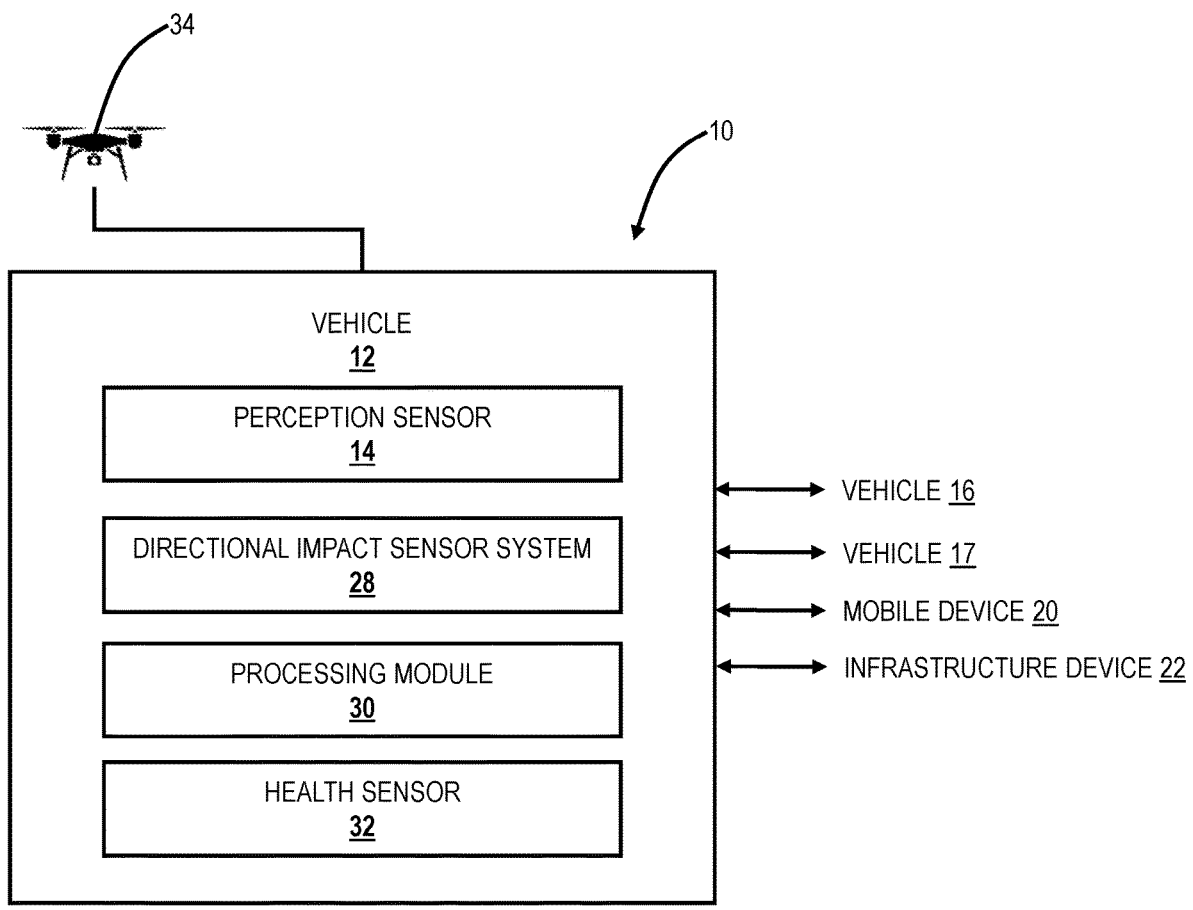
FIG. 2 is a schematic diagram illustrating one embodiment of a vehicle including the evidence collection system of the present disclosure.

FIG. 2 is a schematic diagram illustrating one embodiment of a vehicle 12 including the evidence collection system 10 of the present disclosure. Again, as illustrated (referring also to FIG. 1), the system 10 includes the vehicle 12 including the camera 14 and other data collection sensors and devices, the other vehicles 16,17 including the camera 18,19 and other data collection sensors and devices, the mobile device 20 including the camera and other data collection sensors and devices, and the infrastructure device 22 including the camera and other data collection sensors and devices. The mobile device 20 may be possessed by a person in proximity to the vehicle incident 24 involving the vehicle 12 and another vehicle 16, for example, and the infrastructure device 22 may be a traffic camera or business camera in the area or the like. The other vehicles 16,17, the mobile device 20, and the infrastructure device 22 are able to communicate with the vehicle 12 either directly via wireless or near-field communication links when requested by the vehicle 12, or through the cloud network 26 to which all the components are coupled via wireless, near-field, or wired communication links. The vehicle 12 also includes the directional impact sensor system 28 operable for detecting the vehicle incident 24 and determining the direction associated with the vehicle incident 24. For example, the directional impact sensor system 28 is operable for determining if the vehicle incident 24 involved the front, rear, side, or a combination thereof of the vehicle 12.

The vehicle 12 further includes the processing module 30 including the processor and memory storing instructions for capturing the image/video using the camera 14 of the vehicle 12 responsive to the directional impact sensor system 28 detecting and determining the direction associated with the vehicle incident 24 and requesting and obtaining the image/video from another vehicle 16,17, whether it is the other vehicle 16 involved in the vehicle incident 24 or the nearby vehicle 17, the mobile device 20, and/or the infrastructure device 22 disposed in proximity to the vehicle 12 responsive to the directional impact sensor system 28 detecting and determining the direction associated with the vehicle incident 24. Again, determining the direction associated with the vehicle incident 24 includes determining which side or portion of the vehicle 12 was impacted during the vehicle incident 24, such that the most relevant data can be gathered by the vehicle 12, both by itself and from the surrounding parties.

Capturing the image/video using the camera 14 of the vehicle 12 includes capturing an exterior image/video using an exterior camera of the vehicle 12, and preferably in the direction associated with the vehicle incident 24. Capturing the image/video using the camera 14 of the vehicle 12 may also include capturing an interior image/video using an interior camera of the vehicle 12. Related to this interior observation, the system 10 may also be operable for monitoring vital signs or assessing and monitoring the health state/condition of a driver/occupant of the vehicle 12 responsive to detecting the vehicle incident 24 using one or more of the interior camera coupled to the vehicle 12 and the health sensor device 32 disposed within the vehicle 12. For example, health monitoring may be provided using a camera image and an AI algorithm, one or more health monitoring sensors disposed in the vehicle 12 and coupled to the driver/occupant, etc. The system 10 may be operable for automatically contacting emergency services should the condition of the driver/occupant be or become critical when observed.

The system 10 may further include the drone 34 including the camera deployably coupled to the vehicle 12, the system 10 deploying the drone 12 from the vehicle 12 and capturing an image/video using the drone 34 responsive to the directional impact sensor system 28 detecting and determining the direction associated with the vehicle incident 24.

Again, obtaining the image/video from the camera(s) 17,19 of the other vehicle(s) 16,18, the mobile device 20, and/or the infrastructure device 22 may be constrained to a predetermined period before and after the vehicle incident 24 as specified by the vehicle 12. For example, the vehicle 12 may indicate that it needs data from 30 seconds before the vehicle incident 24 to 1 minute after the vehicle incident 24 to establish what happened, who was at fault and/or the identity of the other vehicle 16 involved. Data may of course include proper timestamp, location, and identification information such that its relevance can be assessed, witnesses can be identified, etc.

Figure 3:
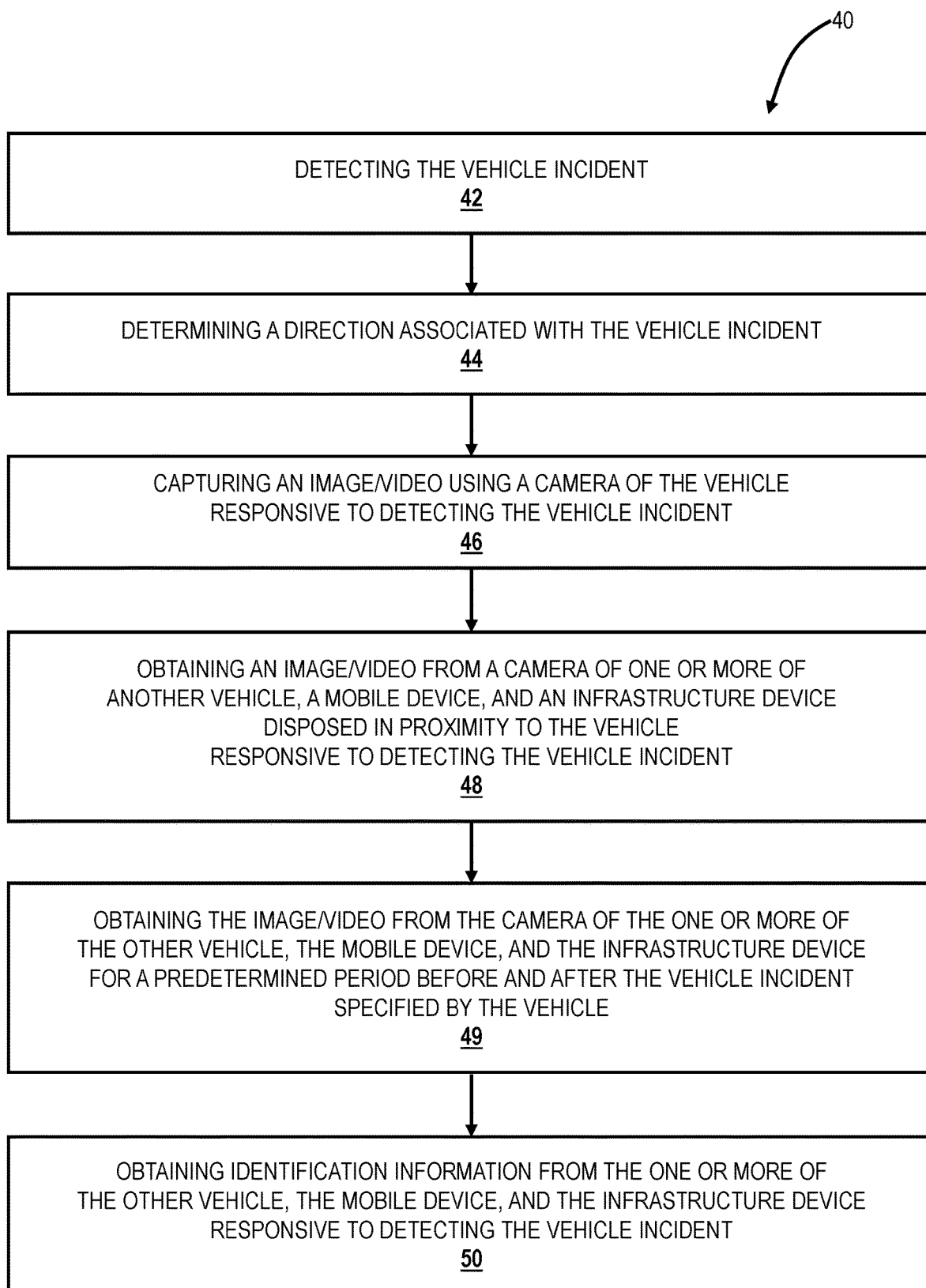
FIG. 3 is a flowchart illustrating one embodiment of the evidence collection method of the present disclosure.

FIG. 3 is a flowchart illustrating one embodiment of the evidence collection method 40 of the present disclosure. The method 40 includes detecting the vehicle incident (step 42) and determining a direction associated with the vehicle incident (step 44). The method 40 also includes capturing an image/video using a camera of the vehicle responsive to detecting the vehicle incident (step 46). The method 40 further includes obtaining an image/video from a camera of one or more of another vehicle, a mobile device, and an infrastructure device disposed in proximity to the vehicle responsive to detecting the vehicle incident (step 48). Determining the direction associated with the vehicle incident includes determining which side of the vehicle was impacted during the vehicle incident. Capturing the image/video using the camera of the vehicle includes capturing an exterior image/video using an exterior camera of the vehicle. Capturing the exterior image/video using the exterior camera of the vehicle includes capturing an image/video in the direction associated with the vehicle incident. Capturing the image/video using the camera of the vehicle may also include capturing an interior image/video using an interior camera of the vehicle. The interior image/video captures a driver/occupant of the vehicle. The other vehicle may include a vehicle also involved in the vehicle incident, or an uninvolved vehicle. The method 40 may further include obtaining identification information from the one or more of the other vehicle, the mobile device, and the infrastructure device responsive to detecting the vehicle incident (step 50). Obtaining the image/video from the camera of the one or more of the other vehicle, the mobile device, and the infrastructure device may include obtaining the image/video for a predetermined period before and after the vehicle incident specified by the vehicle (step 49).

Figure 4:
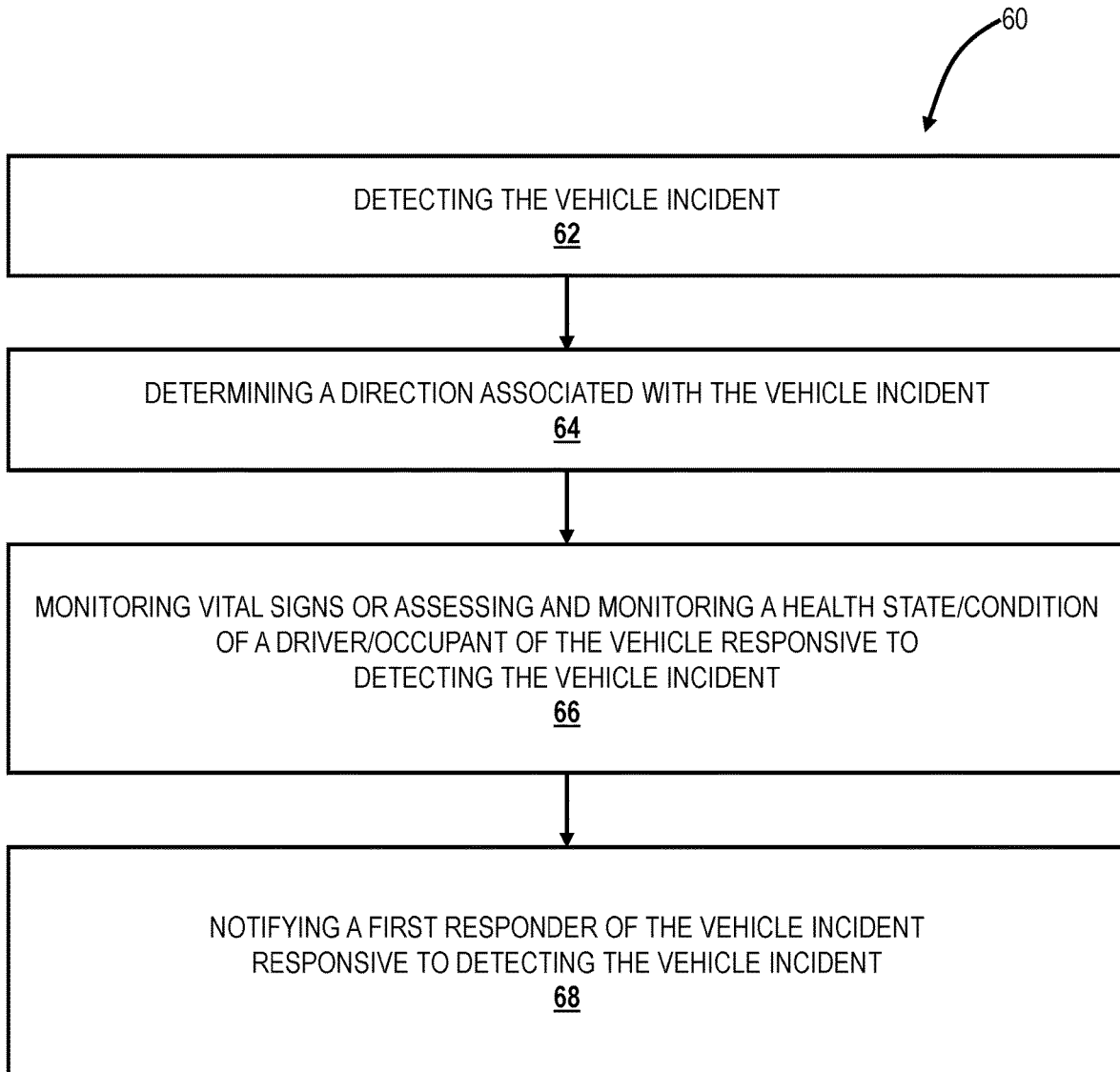
FIG. 4 is a flowchart illustrating another embodiment of the evidence collection method of the present disclosure.

FIG. 4 is a flowchart illustrating another embodiment of the evidence collection method 60 of the present disclosure. The method 60 includes detecting the vehicle incident (step 62) and determining a direction associated with the vehicle incident (step 64). The method 60 further includes monitoring vital signs or assessing and monitoring a health state/condition of a driver/occupant of the vehicle responsive to detecting the vehicle incident (step 66). The method 60 still further includes notifying a first responder of the vehicle incident responsive to detecting the vehicle incident (step 68).

Figure 5:
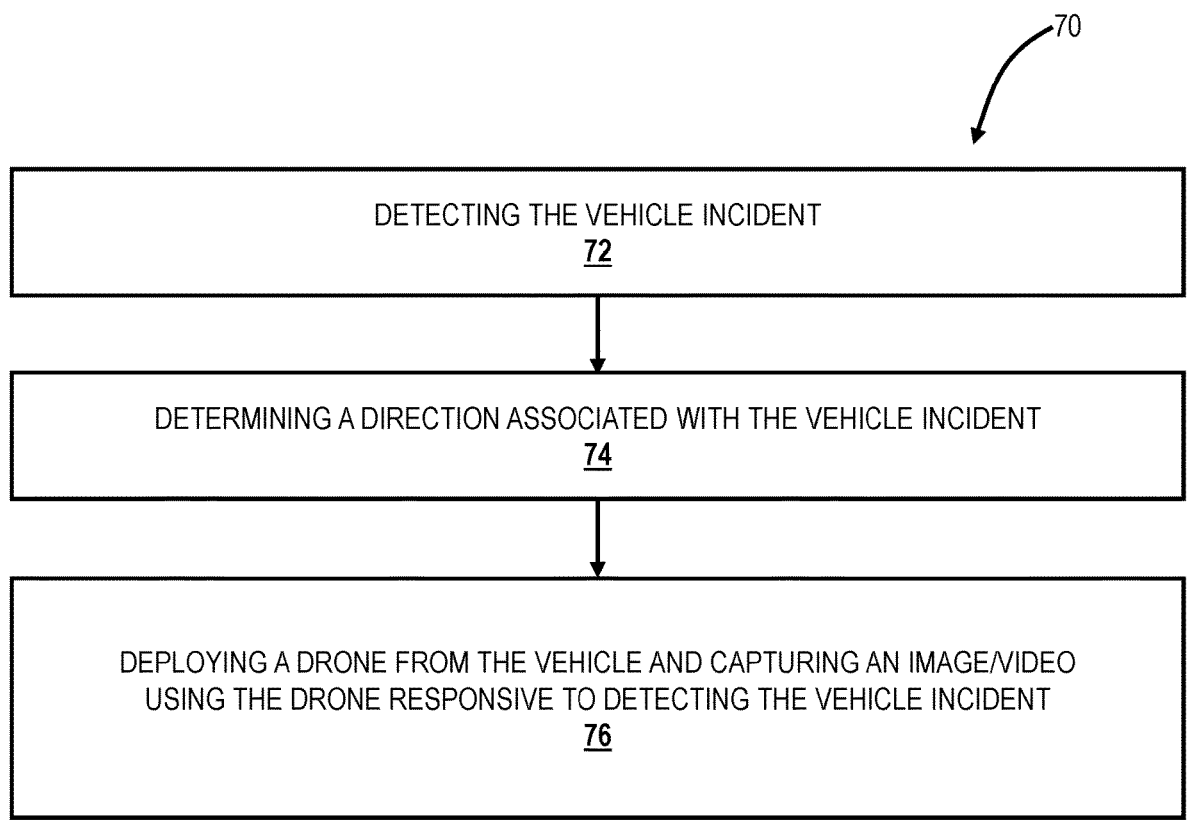
FIG. 5 is a flowchart illustrating a further embodiment of the evidence collection method of the present disclosure.

FIG. 5 is a flowchart illustrating a further embodiment of the evidence collection method 70 of the present disclosure. The method 60 includes detecting the vehicle incident (step 72) and determining a direction associated with the vehicle incident (step 74). The method 70 further includes deploying a drone from the vehicle and capturing an image/video using the drone responsive to detecting the vehicle incident (step 76).

Figure 6:
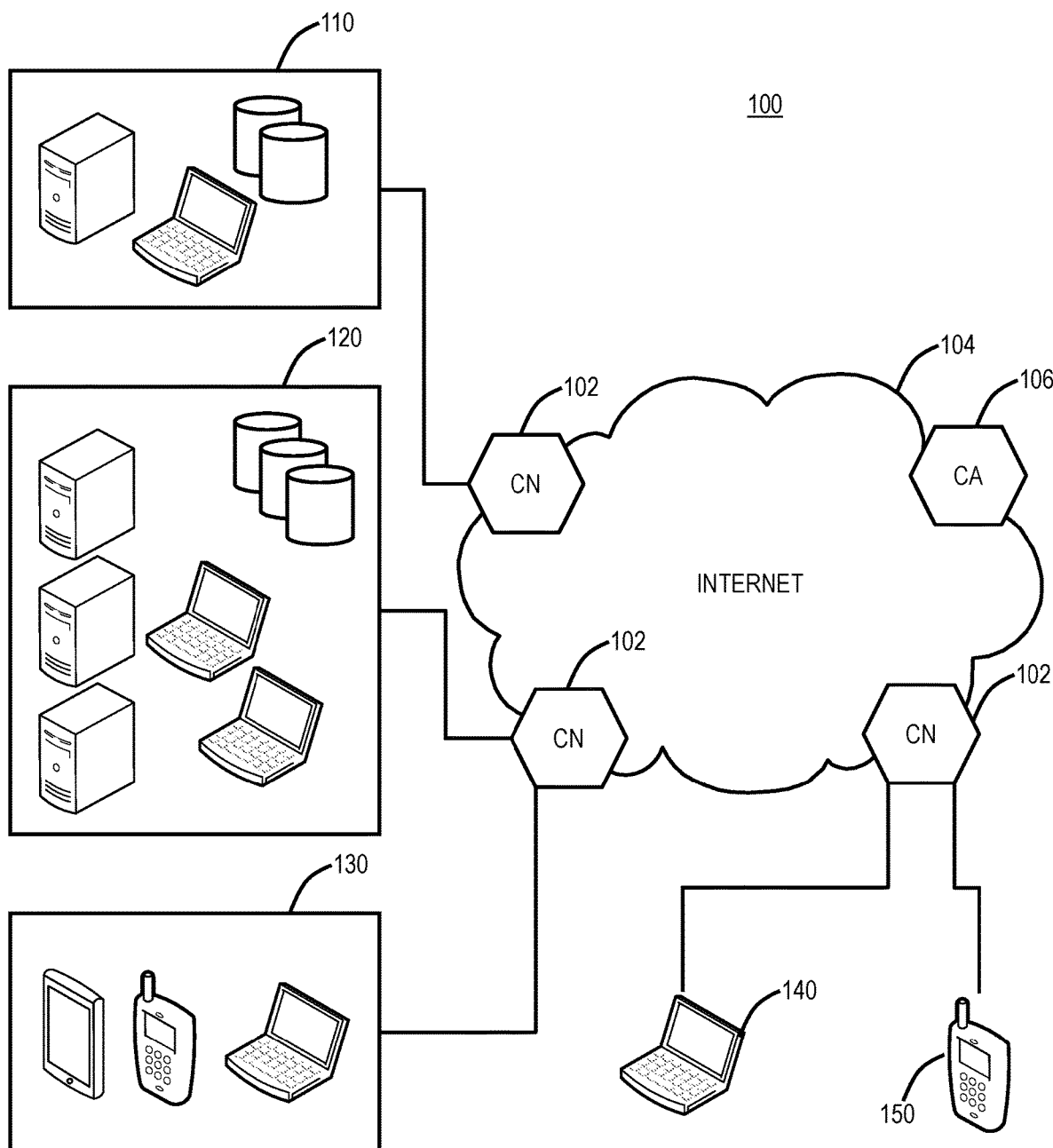
FIG. 6 is a network diagram of a cloud-based system for implementing the various algorithms and services of the present disclosure.
Figure 7:
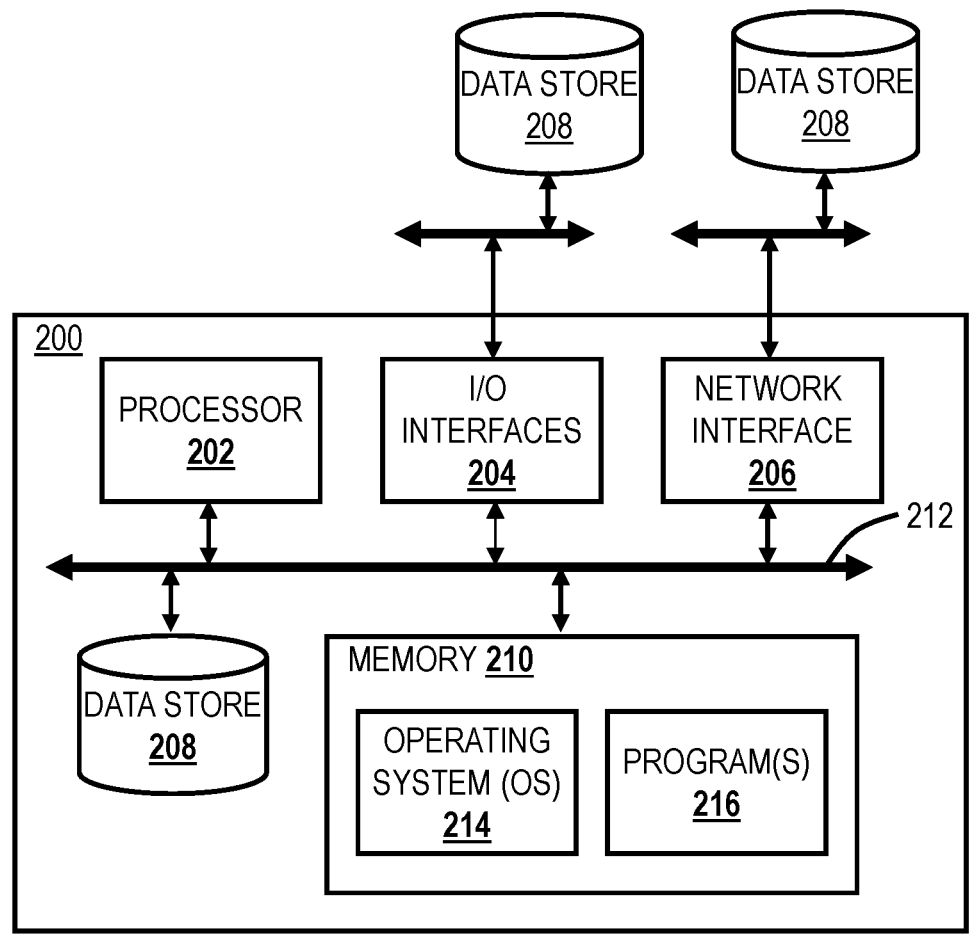
FIG. 7 is a block diagram of a server that may be used in the cloud-based system of FIG. 6 or stand-alone.

FIG. 6 is a network diagram of a cloud-based system 100 for implementing various cloud-based functions and services of the present disclosure. The cloud-based system 100 includes one or more cloud nodes (CNs) 102 communicatively coupled to the Internet 104 or the like. The cloud nodes 102 may be implemented as a server 200 (as illustrated in FIG. 7) or the like and can be geographically diverse from one another, such as located at various data centers around the country or globe. Further, the cloud-based system 100 can include one or more central authority (CA) nodes 106, which similarly can be implemented as the server 200 and be connected to the CNs 102. For illustration purposes, the cloud-based system 100 can connect to a regional office 110, headquarters 120, various employee's homes 130, laptops/desktops 140, and mobile devices 150, each of which can be communicatively coupled to one of the CNs 102. These locations 110, 120, and 130, and devices 140 and 150 are shown for illustrative purposes, and those skilled in the art will recognize there are various access scenarios to the cloud-based system 100, all of which are contemplated herein. The devices 140 and 150 can be so-called road warriors, i.e., users off-site, on-the-road, etc. The cloud-based system 100 can be a private cloud, a public cloud, a combination of a private cloud and a public cloud (hybrid cloud), or the like.

Again, the cloud-based system 100 can provide any functionality through services, such as software-as-a-service (SaaS), platform-as-a-service, infrastructure-as-a-service, security-as-a-service, Virtual Network Functions (VNFs) in a Network Functions Virtualization (NFV) Infrastructure (NFVI), etc. to the locations 110, 120, and 130 and devices 140 and 150. Previously, the Information Technology (IT) deployment model included enterprise resources and applications stored within an enterprise network (i.e., physical devices), behind a firewall, accessible by employees on site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators.

Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The cloud-based system 100 is illustrated herein as one example embodiment of a cloud-based system, and those of ordinary skill in the art will recognize the systems and methods described herein are not necessarily limited thereby.

FIG. 7 is a block diagram of a server 200, which may be used in the cloud-based system 100 (FIG. 6), in other systems, or stand-alone. For example, the CNs 102 (FIG. 6) and the central authority nodes 106 (FIG. 6) may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 6 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but is not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104 (FIG. 6). The network interface 206 may include, for example, an Ethernet card or adapter (e.g., 10BaseT, Fast Ethernet, Gigabit Ethernet, or 10 GbE) or a Wireless Local Area Network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., a SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

It will be appreciated that some embodiments described herein may include one or more generic or specialized processors ("one or more processors") such as microprocessors; central processing units (CPUs); digital signal processors (DSPs); customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable medium having computer-readable code stored thereon for programming a computer, server, appliance, device, processor, circuit, etc. each of which may include a processor to perform functions as described and claimed herein. Examples of such computer-readable mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Figure 8:
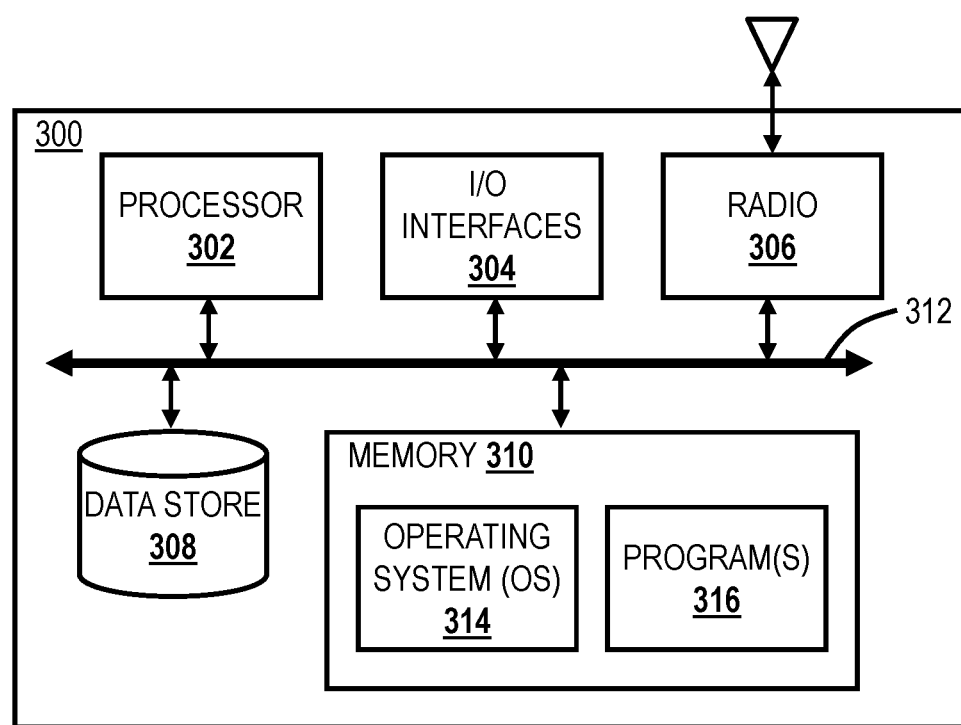
FIG. 8 is a block diagram of a user device that may be used in the cloud-based system of FIG. 6 or stand-alone.

FIG. 8 is a block diagram of a user device 300, which may be used in the cloud-based system 100 (FIG. 6), as part of a network, or stand-alone. Again, the user device 300 can be a vehicle, a smartphone, a tablet, a smartwatch, an Internet of Things (IoT) device, a laptop, a virtual reality (VR) headset, etc. The user device 300 can be a digital device that, in terms of hardware architecture, generally includes a processor 302, I/O interfaces 304, a radio 306, a data store 308, and memory 310. It should be appreciated by those of ordinary skill in the art that FIG. 7 depicts the user device 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 can be, for example, but is not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a liquid crystal display (LCD), touch screen, and the like.

The radio 306 enables wireless communication to an external access device or network. Any number of suitable wireless data communication protocols, techniques, or methodologies can be supported by the radio 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

Again, the memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 8, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network, such as the cloud-based system 100 (FIG. 6).

Again, the present disclosure provides a method and system for collecting evidence following a vehicle incident. The system is operable for detecting and determining a direction associated with the vehicle incident and automatically and contemporaneously requesting and receiving related information from the vehicle itself, potentially from any other vehicle involved, and/or from any surrounding devices, including vehicles, mobile devices, and/or infrastructure devices, that may have captured the vehicle incident.

Upon detecting the vehicle incident, the vehicle initiates exterior image capture using all cameras of the vehicle and, if equipped with a deployable drone, deploys the drone to capture BEV images/video of the surroundings and aftermath of the vehicle incident. Further, the vehicle may capture interior images/video of the driver/occupants to determine whether or not the driver/occupants are injured, monitor vital signs of the driver/occupants, and automatically contact first responders. The vehicle opens a communication link with the other vehicle(s) involved (if the other vehicle(s) have granted prior approval), and/or from the surrounding devices, including the vehicles, the mobile devices, and/or the infrastructure devices. Images/videos are requested with a specific timeframe (e.g., 30 seconds before and 1 minute after the vehicle incident). Various other information may also be exchanged over the bidirectional communication link (e.g., system identifiers, witness names and contact information, etc.).

Although the present disclosure is illustrated and described herein with reference to illustrative embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A method for collecting evidence following a vehicle incident involving a vehicle, the method comprising:

in response to one or more signals communicated from at least one directional impact sensor device coupled to the vehicle and indicating a vehicle impact and a direction associated with the vehicle impact relative to the vehicle including at least one of a side or a portion of the vehicle impacted during the vehicle incident, capturing a most-relevant image/video of at least one of the side or the portion of the vehicle impacted during the vehicle incident using a camera of the vehicle capable of capturing the most relevant data indicating at least one of the side or the portion of the vehicle impacted during the vehicle incident, the most-relevant image/video captured in the direction associated with the vehicle impact relative to the vehicle based on the one or more signals; and in response to the one or more signals communicated from the at least one directional impact sensor device coupled to the vehicle and indicating the vehicle impact and the direction associated with the vehicle impact relative to the vehicle including at least one of the side or the portion of the vehicle impacted during the vehicle incident, automatically and contemporaneously requesting and receiving a most-relevant image/video of at least one of the side or the portion of the vehicle impacted during the vehicle incident from a camera of one or more of (1) another vehicle disposed in proximity to the vehicle, (2) a mobile device disposed in proximity to the vehicle, and (3) an infrastructure device disposed in proximity to the vehicle based on an identification that the camera of the one or more of (1) the another vehicle disposed in proximity to the vehicle, (2) the mobile device disposed in proximity to the vehicle, and (3) the infrastructure device disposed in proximity to the vehicle is capable of capturing the most relevant external data indicating at least one of the side or the portion of the vehicle impacted during the vehicle incident, the requested and received most-relevant image/video captured in a direction associated with the vehicle impact relative to the camera of one or more of (1) the another vehicle, (2) the mobile device, or (3) the infrastructure device based on the direction associated with the vehicle impact relative to the vehicle as indicated by the one or more signals.

2. The method of claim 1, wherein capturing the most-relevant image/video of at least one of the side or the portion of the vehicle impacted during the vehicle incident using the camera of the vehicle comprises capturing an exterior image/video using an exterior camera of the vehicle.

3. The method of claim 1, further comprising:
in response to the one or more signals communicated from the at least one directional impact sensor device coupled to the vehicle and indicating the vehicle impact, capturing an interior image/video using an interior camera of the vehicle.

4. The method of claim 3, wherein the interior image/video captures a driver/occupant of the vehicle.

5. The method of claim 1, wherein (1) the another vehicle comprises a vehicle also involved in the vehicle incident.

6. The method of claim 1, further comprising, in response to the one or more signals communicated from the at least one directional impact sensor device coupled to the vehicle and indicating the vehicle impact, obtaining identification information from the one or more of (1) the another vehicle, (2) the mobile device, and (3) the infrastructure device.

7. The method of claim 1, further comprising, in response to the one or more signals communicated from the at least one directional impact sensor device coupled to the vehicle and indicating the vehicle impact, monitoring vital signs or assessing and monitoring a health state/condition of a driver/occupant of the vehicle.

8. The method of claim 1, further comprising, in response to the one or more signals communicated from the at least one directional impact sensor device coupled to the vehicle and indicating the vehicle impact, automatically and contemporaneously notifying, utilizing the vehicle, a first responder of the vehicle incident.

9. The method of claim 1, further comprising, in response to and based on the one or more signals communicated from the at least one directional impact sensor device coupled to the vehicle and indicating the vehicle impact and the direction associated with the vehicle impact relative to the vehicle, deploying a drone from the vehicle and capturing an image/video of at least one of the side or the portion of the vehicle impacted during the vehicle incident using a camera of the drone.

10. The method of claim 1, wherein obtaining the most-relevant image/video from the camera of the one or more of (1) the another vehicle, (2) the mobile device, and (3) the infrastructure device comprises obtaining the most-relevant image/video for a predetermined period before and after the vehicle incident specified by the vehicle.

11. A system for collecting evidence following a vehicle incident involving a vehicle, the system comprising:
a directional impact sensor device coupled to the vehicle;
a camera coupled to the vehicle; and
a memory storing instructions executed by a processor for:
in response to one or more signals communicated from the directional impact sensor device indicating a vehicle impact and a direction associated with the vehicle impact relative to the vehicle including at least one of a side or a portion of the vehicle impacted during the vehicle incident, capturing a most-relevant image/video of at least one of the side or the portion of the vehicle impacted during the vehicle incident using the camera of the vehicle, the camera of the vehicle capable of capturing the most relevant data indicating at least one of the side or the portion of the vehicle impacted during the vehicle incident, the most-relevant image/video captured in the direction associated with the vehicle impact relative to the vehicle based on the one or more signals; and
in response to the one or more signals communicated from the directional impact sensor device coupled to the vehicle and indicating the vehicle impact and the direction associated with the vehicle impact relative to the vehicle including at least one of the side or the portion of the vehicle impacted during the vehicle incident, automatically and contemporaneously requesting and receiving a most-relevant image/video of at least one of the side or the portion of the vehicle impacted during the vehicle incident from a camera of one or more of (1) another vehicle disposed in proximity to the vehicle, (2) a mobile device disposed in proximity to the vehicle, and (3) an infrastructure device disposed in proximity to the vehicle based on an identification that the camera of the one or more of (1) the another vehicle disposed in proximity to the vehicle, (2) the mobile device disposed in proximity to the vehicle, and (3) the infrastructure device disposed in proximity to the vehicle is capable of capturing the most relevant external data indicating at least one of the side or the portion of the vehicle impacted during the vehicle incident, the requested and received most-relevant image/video captured in a direction associated with the vehicle impact relative to the camera of the one or more of the (1) another vehicle, (2) the mobile device, or (3) the infrastructure device based on the direction associated with the vehicle impact relative to the vehicle as indicated by the one or more signals.

12. The system of claim 11, wherein capturing the most-relevant image/video of at least one of the side or the portion of the vehicle impacted during the vehicle incident using the camera of the vehicle comprises capturing an exterior image/video using an exterior camera of the vehicle.

13. The system of claim 11, further comprising:
in response to the one or more signals communicated from the at least one directional impact sensor device coupled to the vehicle and indicating the vehicle impact, capturing an interior image/video using an interior camera of the vehicle.

14. The system of claim 11, the memory further storing instructions executed by the processor for, in response to the one or more signals communicated from the at least one directional impact sensor device coupled to the vehicle and indicating the vehicle impact, monitoring vital signs or assessing and monitoring a health state/condition of a driver/ occupant of the vehicle using one or more of an interior camera coupled to the vehicle and a health sensor device disposed within the vehicle.

15. The system of claim 11, further comprising a drone deployably coupled to the vehicle, the memory further storing instructions executed by the processor for, in response to and based on the one or more signals communicated from the at least one directional impact sensor device coupled to the vehicle and indicating the vehicle impact and the direction associated with the vehicle impact relative to the vehicle, deploying the drone from the vehicle and capturing an image/video of at least one of the side or the portion of the vehicle impacted during the vehicle incident using a camera of the drone.

16. A non-transitory computer readable medium comprising instructions stored in a memory and executed by a processor to carry out steps for collecting evidence following a vehicle incident involving a vehicle, the steps comprising:

in response to one or more signals communicated from at least one directional impact sensor device coupled to the vehicle and indicating a vehicle impact and a direction associated with the vehicle impact relative to the vehicle including at least one of a side or a portion of the vehicle impacted during the vehicle incident, capturing a most-relevant image/video of at least one of the side or the portion of the vehicle impacted during the vehicle incident using a camera of the vehicle capable of capturing the most relevant data indicating at least one of the side or the portion of the vehicle impacted during the vehicle incident, the most-relevant image/video captured in the direction associated with the vehicle impact relative to the vehicle based on the one or more signals; and in response to the one or more signals communicated from the at least one directional impact sensor device coupled to the vehicle and indicating the vehicle impact and the direction associated with the vehicle impact relative to the vehicle including at least one of the side or the portion of the vehicle impacted during the vehicle incident, automatically and contemporaneously requesting and receiving a most-relevant image/video of at least one of the side or the portion of the vehicle impacted during the vehicle incident from a camera of one or more of (1) another vehicle disposed in proximity to the vehicle, (2) a mobile device disposed in proximity to the vehicle, and (3) an infrastructure device disposed in proximity to the vehicle based on an identification that the camera of the one or more of (1) the another vehicle disposed in proximity to the vehicle, (2) the mobile device disposed in proximity to the vehicle, and (3) the infrastructure device disposed in proximity to the vehicle is capable of capturing the most relevant external data indicating at least one of the side or the portion of the vehicle impacted during the vehicle incident, the requested and received most-relevant image/video captured in a direction associated with the vehicle impact relative to the camera of one or more of (1) the another vehicle, (2) the mobile device, or (3) the infrastructure device based on the direction associated with the vehicle impact relative to the vehicle as indicated by the one or more signals.

\* \* \* \* \*